(12) United States Patent
Viswanath et al.

(10) Patent No.: US 11,947,885 B1
(45) Date of Patent: Apr. 2, 2024

(54) LOW-POWER STATIC SIGNOFF VERIFICATION FROM WITHIN AN IMPLEMENTATION TOOL

(71) Applicant: Synopsys, Inc., Sunnyvale, CA (US)

(72) Inventors: Meera Viswanath, Sunnyvale, CA (US); David Allen, Fremont, CA (US); Sabyasachi Das, San Jose, CA (US); Kaushik De, Pleasanton, CA (US); Renu Mehra, Cupertino, CA (US); Godwin R. Maben, San Jose, CA (US)

(73) Assignee: SYNOPSYS, INC., Sunnyvale, CA (US)

(*) Notice: Subject to any disclaimer, the term of this patent is extended or adjusted under 35 U.S.C. 154(b) by 208 days.

(21) Appl. No.: 17/481,946

(22) Filed: Sep. 22, 2021

Related U.S. Application Data

(60) Provisional application No. 63/081,424, filed on Sep. 22, 2020.

(51) Int. Cl.
*G06F 30/327* (2020.01)
*G06F 1/28* (2006.01)

(52) U.S. Cl.
CPC .............. *G06F 30/327* (2020.01); *G06F 1/28* (2013.01)

(58) Field of Classification Search
CPC .......... G06F 30/327; G06F 1/28; G06F 30/30; G06F 30/33; G06F 30/337; G06F 30/367; G06F 30/398
USPC ........................................................ 716/100
See application file for complete search history.

(56) References Cited

U.S. PATENT DOCUMENTS

| | | | |
|---|---|---|---|
| 2007/0245285 A1* | 10/2007 | Wang | G06F 30/327 716/109 |
| 2021/0019461 A1* | 1/2021 | Nizam | G06F 30/33 |

* cited by examiner

*Primary Examiner* — Paul Dinh
(74) *Attorney, Agent, or Firm* — Lewis Roca Rothgerber Christie LLP

(57) ABSTRACT

In one aspect, a method includes invoking a signoff tool via a first command from an implementation tool running on a register transfer level (RTL) design, and executing a native command of the signoff tool from within the implementation tool. The native command generates a notification. The method also includes determining whether the RTL design passes a low-power signoff check based on the notification and sending the design for final signoff verification based on the determination that the RTL design passes the low-power signoff checks.

20 Claims, 8 Drawing Sheets

US 11,947,885 B1

LOW-POWER STATIC SIGNOFF VERIFICATION FROM WITHIN AN IMPLEMENTATION TOOL

CROSS-REFERENCE TO RELATED APPLICATIONS

The present application claims the benefit under 35 U.S.C. § 119(e) of U.S. Provisional Patent Application No. 63/081,424 filed on Sep. 22, 2020, which is incorporated herein by reference in its entirety for all purposes.

TECHNICAL FIELD

The present disclosure relates generally to an electronic design automation (EDA) system. In particular, the present disclosure relates to performing low-power static signoff verification from within an implementation tool.

BACKGROUND

System on chip (SoC) designs use low power design techniques to enable support for advanced power management required in many of today's electronic products, including mobile devices, servers, and networking equipment. Advanced low power techniques such as power gating, retention, low-supply voltage (VDD) standby, and dynamic voltage scaling (DVS) employ voltage control to enable fine-grained power management and are seeing increasing adoption. Due to the nature of low power design architectures and behavior, verification and signoff for low power designs are exponentially more challenging than for always-on designs. The electronics industry has developed a wide range of techniques for power management and has defined the Unified Power Format (UPF), which is an Institute of Electrical and Electronics Engineers (IEEE) 1801 Standard, to describe design intent for some of the most common methods of power management. Successful development of low power semiconductor designs includes checking UPF descriptions as well as verifying UPF against the design at multiple stages in the project using, for example, low-power static checker tools. The low-power static checker tools provide extensive reporting, filtering, and waiving capabilities to simplify and expedite low power verification signoff flows.

SUMMARY

In one aspect, a method includes invoking a signoff tool via a first command from an implementation tool running on a register transfer level (RTL) design, and executing a native command of the signoff tool from within the implementation tool. The native command generates a notification. The method also includes determining whether the RTL design passes a low-power signoff check based on the notification and sending the design for final signoff verification based on the determination that the RTL design passes the low-power signoff checks.

In one aspect, a system includes a memory storing instructions, and a processor, coupled with the memory and to execute the instructions. The instructions when executed cause the processor to invoke a signoff tool via a first command from an implementation tool running on a register transfer level (RTL) design, execute a native command of the signoff tool from within the implementation tool wherein the native command generates a notification, determine whether the RTL design passes a low-power signoff check based on the notification, and send the design for final signoff.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
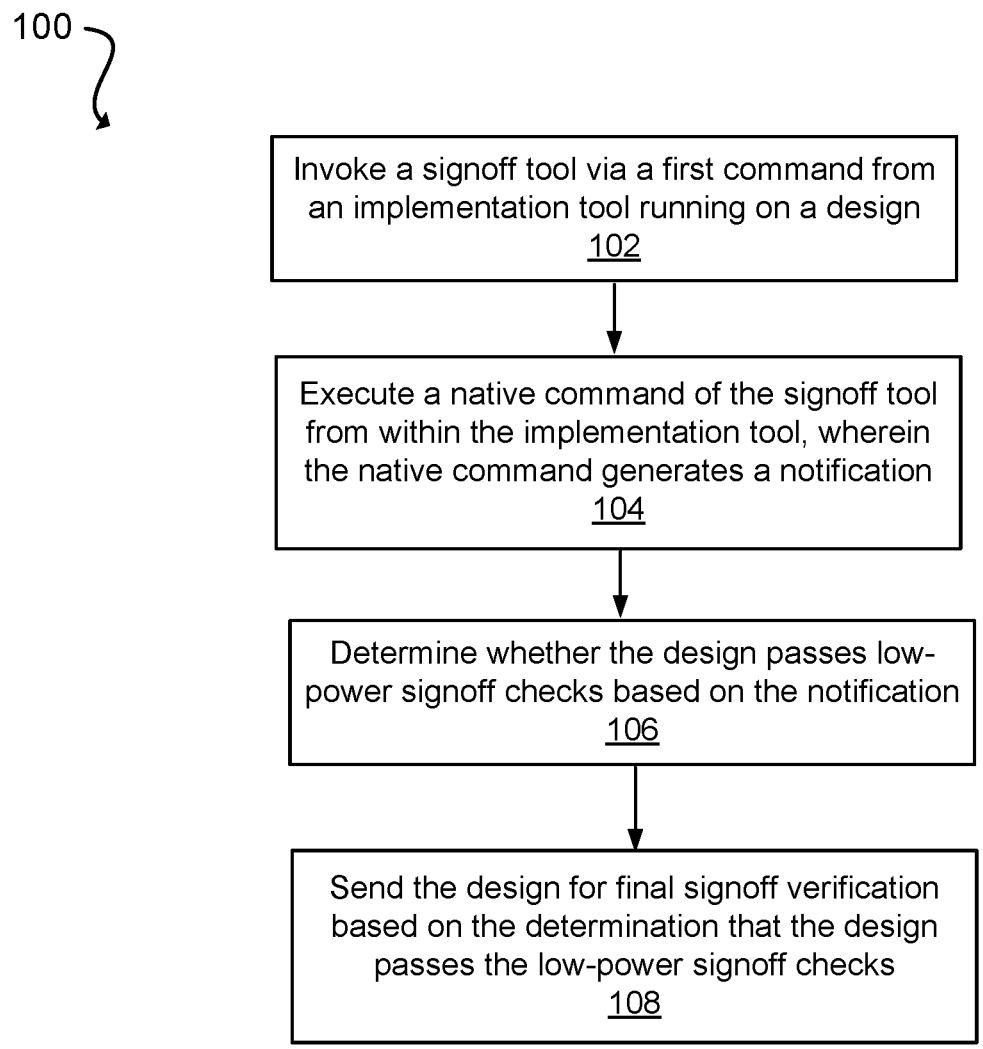
FIG. 1 illustrates a flowchart for performing low-power static signoff from within an implementation tool, in accordance with an embodiment of the present disclosure.

An objective of the present disclosure is to enable a design implementation engineer/team to perform a low-power signoff checking of an implementation database from within an implementation tool and fix all errors priors to passing the implementation database including the design specification to the implementation signoff team. Accordingly, iterations between implementation and low-power signoff checks may be reduced and the process may be streamlined reducing a turnaround time.

Currently, low-power signoff tools are separate from implementation tools and while backend engineers perform the implementation, a different team of signoff engineers performs verification. Any errors or warnings detected during the signoff stage by the signoff engineers using the signoff tool may need to be fixed in the implementation tool. Then, the signoff tool may be run again to check whether the errors are fixed. During the rerun if new errors are detected, the process of fixing the errors in the implementation tool and then running the tests by the signoff team in the signoff tool continues for many iterations. This results in multiple iterations of testing each by the implementation and signoff teams and requires a lot of coordination between the implementation and signoff teams before the design is clean.

In some embodiments, signoff quality electrical rule check (ERC) checking may be performed to reduce a number of iterations between implementation and signoff checks. The ERC checking may check the robustness of a design and layout levels against a plurality of electronic design rules. The low-power ERC checking may be performed on an almost final database using a signoff tool. For example, the low-power ERC checking may be performed at register transfer level RTL post-synthesis, and post place and route (P&R). The signoff tool may include waivers/exceptions for the entire project (e.g., waiving one or more rules) that may be unknown to an implementation engineer. However, by integrating the signoff tool in the implementation tool, the problem of multiple iterations of testing can be addressed by performing signoff tests from within the implementation tool that is familiar to the implementation engineer.

The present disclosure describes the ability to invoke and interact with the signoff tool from within the implementation tool. The ability to invoke the signoff tool from within the implementation tool is referred to herein as the cross-probing feature or the link feature. An implementation user may invoke a signoff tool from within the implementation tool and perform signoff checks. The signoff checks may include power intent consistency checks, architectural checks, structural and power and ground (PG) checks, and functional checks. Any errors or warnings detected may be addressed by running engineering change order (ECO) commands in the implementation tool or other commands as needed. The signoff tool may be executed again to identify which errors were fixed and which ones may need to be further addressed. Additionally, the approaches described herein also give the implementation user the ability to display a design schematic in a graphical user interface (GUI) of the signoff tool and/or the implementation tool. The implementation tool may zoom into a selected instance in a GUI of the implementation tool by running a command. The cross-probing feature may help quickly identify issues that can be fixed. The cross-probing feature may help the backend engineer to clean-up the final database considerably before it may be passed on to the signoff engineer.

As described above, the present disclosure enables invoking and interacting with a standalone static signoff checker from within the implementation tool. The present disclosure also enables executing commands of the signoff tool from within the implementation tool using one or more commands. In some aspects, a GUI cross-probing feature may be used to select a highlighted instance in the GUI of the signoff tool and in the GUI of the implementation tool. For example, a selected instance may be highlighted in both the GUI of the signoff tool and of the implementation tool. In some aspects, a user may select an instance in the GUI of the signoff tool. An attribute associated with the instance may also be modified in the GUI of the implementation tool. For example, a display color associated with the instance may be changed.

In some embodiments, the signoff tool may be invoked using a user interface (UI) command of a plurality of (UI) commands from the implementation tool. The UI command may invoke and run the signoff tool, run standalone commands in the signoff tool from within the implementation tool, and provide GUI cross-probing for a selected instance. Other auxiliary UI commands may help set and report specific settings related to the signoff tool and exit the signoff tool while continuing to run from within the implementation tool.

In some embodiments, a first UI command to invoke and run the signoff tool may be provided. The UI command may perform the full run of the signoff tool. In some aspects, the UI command may execute a subset of the signoff checks. For example, the UI command may execute ERC checks. By way of a non-limiting example, other UI commands may be provided in the implementation tool to run one or more specific commands that may be native to the signoff tool. In some aspects, a second UI command may be provided to set an application specific variable in the signoff tool. For example, the second UI command may specify a pointer to the link libraries or a new working directory that is not a default current directory.

In some embodiments, a third UI command may highlight the instance (selected in the GUI of the signoff tool) in the GUI of the implementation tool. This may help in faster debugging using the GUI. The third UI command may help zoom into the selected instance (in the GUI of the signoff tool) in the GUI of the implementation tool. Other UI commands may also be provided that may set and report signoff tool related settings and exit the signoff tool when needed, while continuing to run the implementation tool. In some aspects, the signoff tool may be automatically closed once the design passes the signoff checks.

Additional options allow support for other features, such as golden unified power format (UPF) flow and hierarchical flow to work with the approaches described herein.

In some embodiments, finer grain controls help users specify how the Verilog/UPF files may be written out by the implementation tool for consumption by the signoff tool. The link feature may allow one or more formats of Verilog/UPF files that are supported by the implementation tool (e.g., written out by the implementation tool) while running standalone to be supported (e.g., written out) with the link feature and for consumption by the signoff tool.

In some embodiments, golden UPF may refer to an original register transfer level (RTL) UPF specified by the user. The original RTL UPF file may be unaltered throughout the flow. During design implementation in synthesis/implementation tools, the synthesis/implementation tools may infer and derive a new UPF intent. For example, the implementation tool may insert an isolation cell that creates a no isolation strategy on newly created ports along UPF control signal paths. The isolation cell may be used to isolate signals between two power domains where one is switched on and the other is switched off. Thus, a new UPF is created.

In some embodiments, implementation tools may provide a golden UPF mode. In golden UPF mode, a supplemental UPF file may be written out by the implementation tool to capture changes such as the one described above (e.g., insertion of isolation cells). Subsequent tools, in the design flow, may read the golden UPF file along with the supplemental UPF file written out by the implementation tool. In some embodiments, a name-map file that may be generated (written out) by the implementation tool to keep track of name changes (e.g., cells, pin name). The name-map file may need to be read in by subsequent tools, including signoff tools.

In some embodiments, a link feature of the implementation tool may provide a command to invoke the signoff tool. The signoff tool may auto-detect that the implementation tool is being run in the golden UPF mode. For example, the signoff tool may automatically read an attribute value that indicates whether the implementation tool is running in the golden UPF mode. In some embodiments, the signoff tool may require the implementation user to specify paths to the golden UPF files. For example, a prompt may be displayed on the GUI of the implementation tool for the user to specify the paths to the golden UPF files. The supplemental UPF file and the name-map file (e.g., generated the implementation tool) may be auto-read in by the signoff tool before the signoff tool performs any checks. This may give the implementation user the flexibility to use the link feature for designs with the golden UPF mode enabled.

In some embodiments, for hierarchical designs or designs with the golden UPF mode enabled, users can provide additional options to point to the golden UPF files or to indicate how the UPF may be written out for a given hierarchical design. For example, the user may indicate whether the UPF is for the full chip or at block level.

FIG. 1 illustrates a flowchart 100 for performing low-power static signoff verification from within an implementation tool, according to an exemplary embodiment of the present disclosure. In 102, a signoff tool may be invoked via a first command from an implementation tool running on a design (e.g., RTL design). The RTL design may be in the form of a structural netlist based design. In some embodiments, the signoff tool may be invoked using a graphical user interface or a shell command-line interface.

In 104, a native command of the signoff tool is executed from within the implementation tool. The native command may run low-power signoff checks. The low-power signoff checks may include a subset of the signoff checks performed on a design. For example, the low-power signoff checks may include ERC checks. In some aspects, the native command executes a signoff algorithm for performing ERC checking on the RTL design. The native command may generate a notification. The notification may include a warning, an error, or information data generated by the signoff tool. In some aspects, the signoff tool may generate an error data file and/or a result file.

In 106, a determination is made whether the RTL design passes low-power signoff checks based on the notification. In some embodiments, the signoff tool may be closed automatically when the RTL design passes the low-power signoff checks. In some embodiments, the signoff tool may be closed responsive to a command from the user received by the implementation tool (e.g., via the GUI or the shell command-line interface of the implementation tool).

In 108, the design is sent for final signoff verification based on the determination that the RTL design passes low-power signoff checks.

Figure 2:
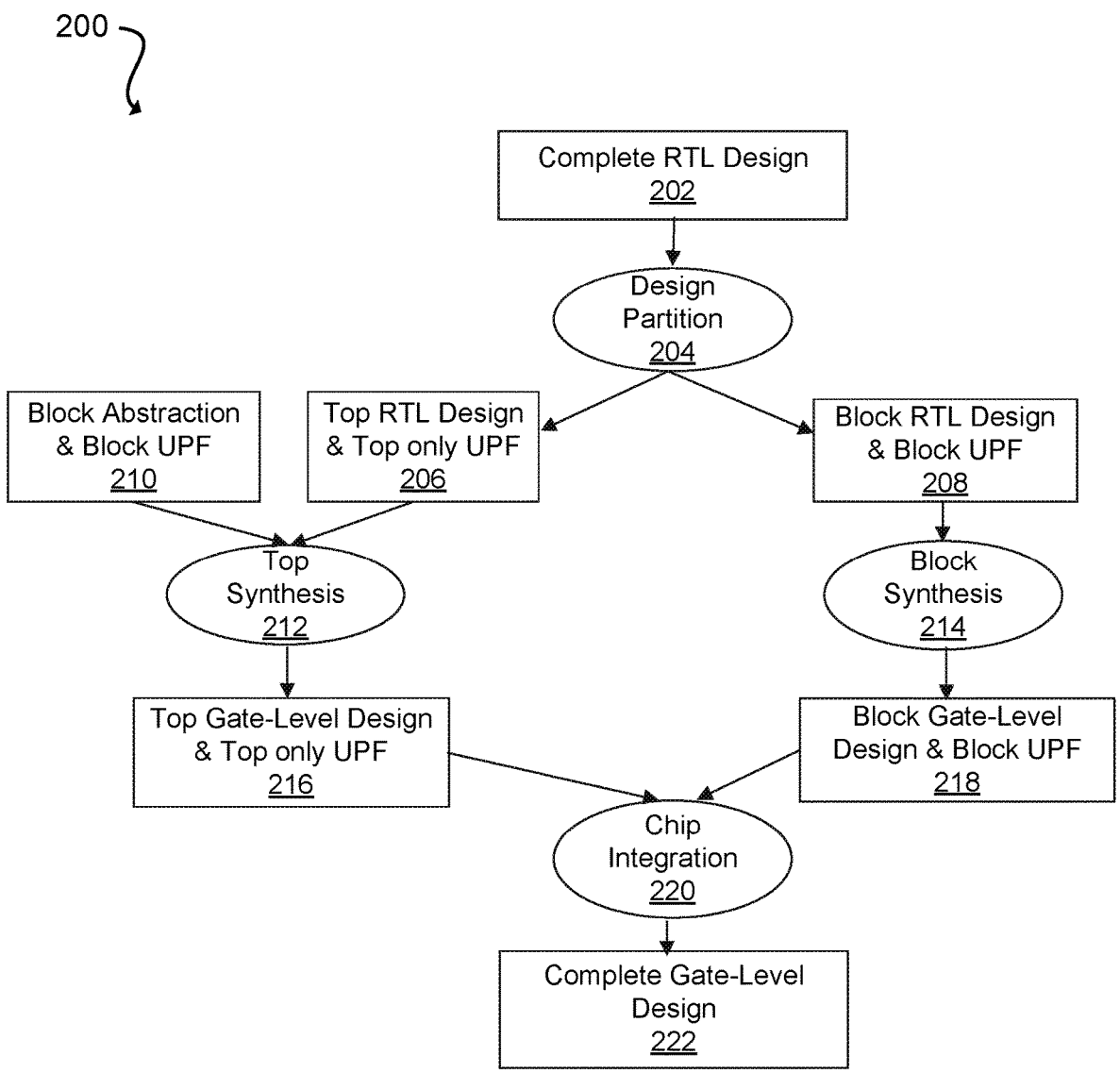
FIG. 2 illustrates a hierarchical process flow, in accordance with an embodiment of the present disclosure.

FIG. 2 illustrates a hierarchical process flow 200, according to an exemplary embodiment of the present disclosure. At 202, a RTL design (e.g., complete RTL design) stored in a database may be accessed. At 204, the RTL design may be partitioned. The RTL design may be divided into multiple blocks. Each block of the multiple blocks may be designed and verified once, and then used in many places in the RTL design. The RTL design may be partitioned into a top-level and a block-level. At the top-level design, the blocks are viewed as black boxes with well-defined functions.

In some embodiments, fine-grain control may be provided so that the implementation user can specify whether the verification is to be performed at the top-level or at the block-level for hierarchical designs. Additional finer grain controls may give the implementation user full control to write out the Verilog and UPF files used by the signoff checker in various modes. The implementation user may include/exclude certain types of cells, such as pad cells or physical-only cells from being written out in the Verilog/UPF that are used by the signoff tool based on the block abstraction and block UPF files, as shown by 210. Block abstraction includes all the block design detail and interface logic.

At 206, verification of the top-level RTL design may be performed. The top-level RTL design may define how the block are interconnected. Top-level UPF files may be accessed. The top-level UPF files specify top-level power-state combinations associated with the blocks that are incorporated into the top-level design description. The top-level UPF files may be read-in from a top-level circuit description. The signoff tool may execute signoff checks on the top-level RTL design.

At 208, verification of the block-level RTL design may be performed. In some embodiments, block-level UPF files may be accessed from a block-level circuit description. A block-level UPF file associated with a block describes combination of power supply voltage levels for which the block is designed to operate properly.

At 212 and 214, top-level synthesis and block-level synthesis may be performed, respectively. Top-level synthesis may include setting timing, load and power constraints. In some embodiments, the block abstraction file, the block-level UPF, the top-level UPF, and the top-level RT as input to the top-level synthesis process. The top-level synthesis results may include power, area, and timing reports. The top-level synthesis may output a top-level model that may be used to generate a top gate-level design.

At 216, an integration tool may be executed for the top gate-level design and top only UPF. For example, a gate-level netlist may be synthesized.

At 218, the integration tool may be executed for block gate-level design and block UPF. Based on the results of the integration tool, chip integration may be performed at 220 to generate final RTL design in the database to arrive at a complete gate-level design at 222.

Figure 3:
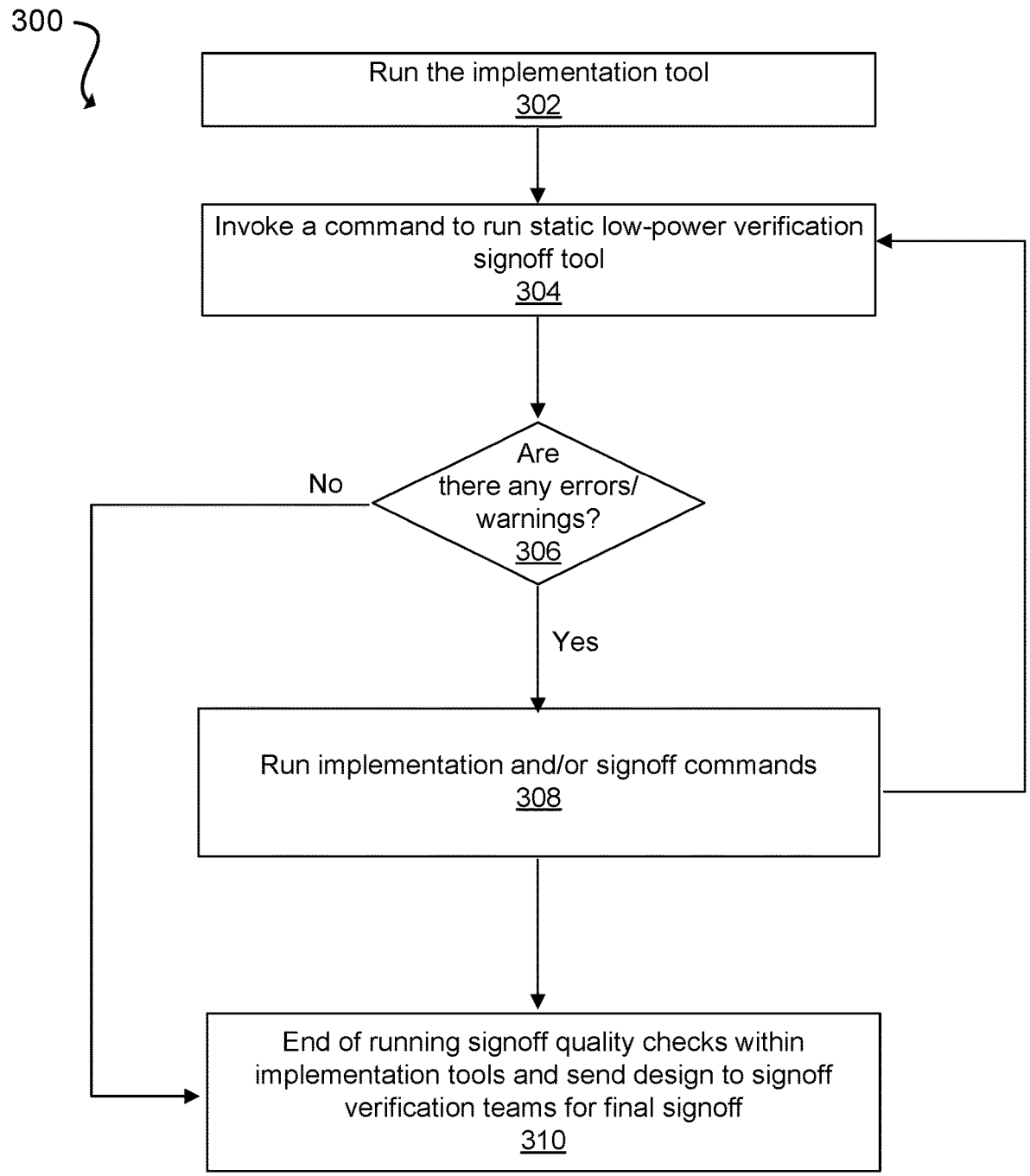
FIG. 3 illustrates a flowchart to perform low-power static signoff verification from within an implementation tool, in accordance with an embodiment of the present disclosure.

FIG. 3 illustrates a flowchart 300 to perform low-power static signoff verification from within an implementation tool, according to an exemplary embodiment of the present disclosure. At 302, an implementation tool may be executed for a design (e.g., a RTL design).

At 304, a command may be executed to invoke a signoff tool while the implementation tool is running. For example, a user interface (UI) command can be executed to invoke and run the signoff tool. As described previously herein, the signoff tool may be invoked using the GUI of the implementation tool or using the shell command-line interface.

In some embodiments, an additional command may be used to select the signoff tool to be invoked. For example, the user may select a specific version of the signoff tool to be invoked and run on the design. In some aspects, a default version (preset) of the signoff tool may be invoked in response to the command when the user does not select a specific version.

In some embodiments, the implementation tool may check whether the implementation tool is running in the golden UPF mode. In response determining that the implementation tool is running in a golden UPF mode, the implementation tool may communicate to the signoff tool a location of the supplemental tool and the golden UPF. In addition, the implementation tool may send to the signoff tool data associated with the RTL design. The implementation tool may also send additional data associated with settings selected by the user to the signoff tool. The settings may include a directory for the results (e.g., log file, error file). For example, if the user select a directory for the results generated by the implementation tool, the same directory may be communicated to the signoff tool. Then, the results generated by the signoff tool are stored in the same directory specified in the implementation tool. Other commands may be used to check the current setting of the signoff tool, for example a report command may be used to output the current settings (e.g., directory, version of the signoff tool). Then, the user can decide whether to change any setting (e.g., by running additional commands from the implementation tool) before proceeding with the signoff checks.

In some aspects, the settings may include whether top level or block level verification is being performed. When block verification is being performed, information associated with the block are sent to the signoff tool. If top-level verification is selected then information associated with the top-level RTL design are sent. In addition, the user may specify in the implementation tool whether to exclude certain types of cells from the low-power signoff checking. For example, the user may specify certain types of cells to be excluded or to perform signoff checking on certain cell types (e.g., standard cells, filler cells, pad cells).

In some embodiments, waiver data may sent from the implementation tool to the signoff tool. The waiver data may include information for waiving any known ERC violation. The waived ERC may be then excluded from an error log or the notification.

The signoff tool may run ERC checks on the design. The ERC checks may include power intent consistency checks, architectural checks, structural and Power and Ground (PG) checks, hierarchical power state analysis and functional checks, and the like. For example, power intent consistency checks may include syntax and semantic checks on UPF to validate the constancy of the UPF prior to implementation. The structural and PG checks can validate insertion and connection of isolation cells, power switches, level shifters, retention registers and always-on cells.

At 306, results from the execution of the signoff tool may be checked for a notification including any errors and/or warnings. If the notification suggests that there is no error and/or warning, then as shown as 310, the signoff tool may be stopped and the design may be finalized to send it to the signoff team for the final signoff procedure. However, if an error and/or warning is detected in the output from the signoff tool then as shown as 308, a GUI associated with the signoff tool may be opened and a specific instance corresponding to the error and/or warning may be accessed to view in a GUI of the implementation tool. In 308, one or more commands of the implementation tools may be executed (i.e., run). For example, commands that may target data nets or clock nets may be run. In one example, a command to fix the power for the specific instance associated with the error may be run. In some aspects, data associated with the error and/or warning are sent to the implementation tool.

Upon fixing of the error and/or warning, the implementation tool may be executed again and the signoff tool may be invoked again as shown by 304. In some embodiments, a command may be used to run the low-power signoff checks on only the block that have been modified at 308. By way of a non-limiting example, upon fixing of the error and/or warning, the design may be sent to the signoff team without re-executing the signoff tool from within the implementation tool. In some embodiments, the communication between the signoff tool and the implementation tool may end when a user enter a command in the implementation tool and/or when the implementation tool is exited.

Figure 4A:
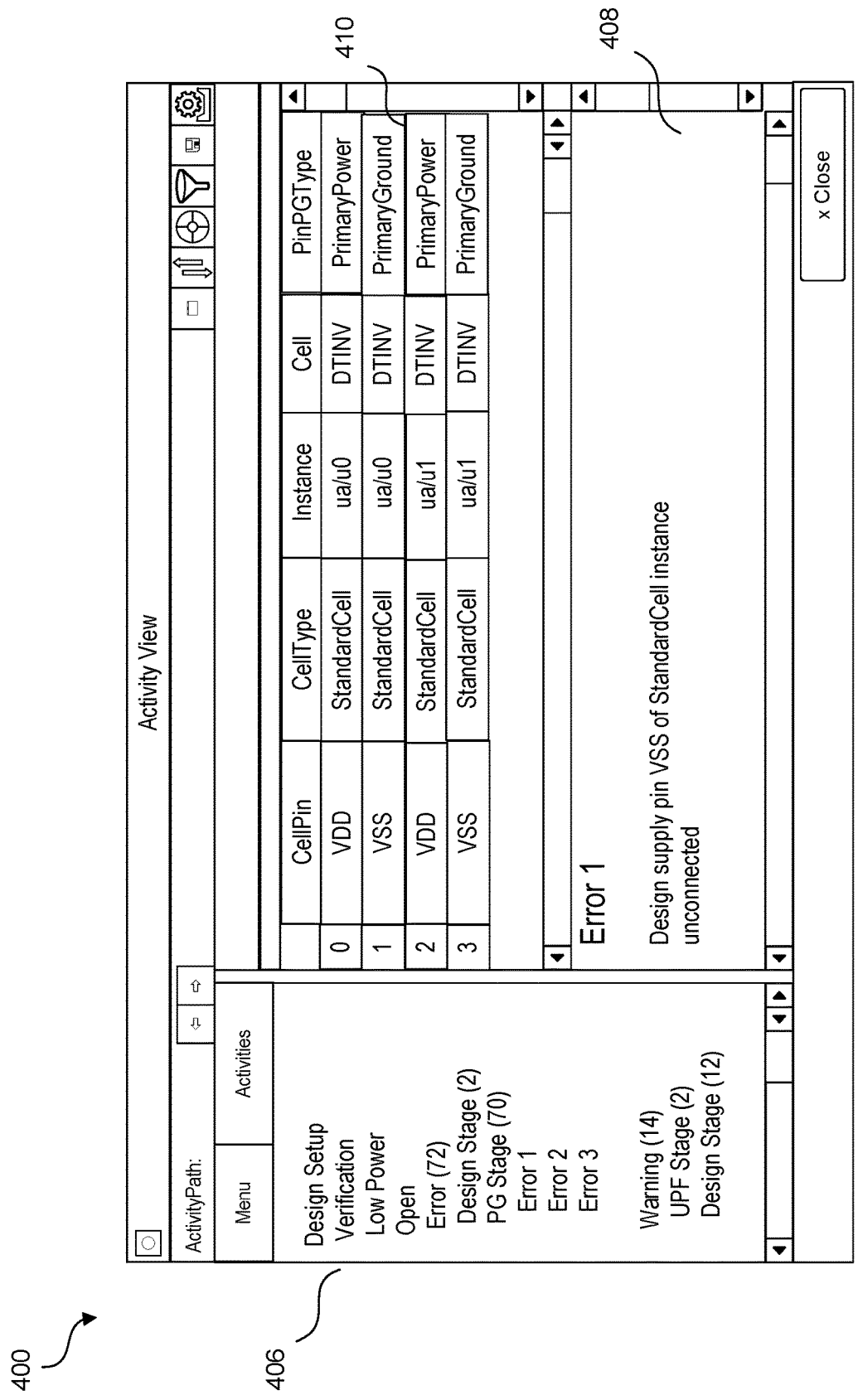
FIGS. 4A-4C illustrate exemplary graphic user interfaces to perform low-power static signoff verification from within an implementation tool, in accordance with an embodiment of the present disclosure.
Figure 4B:
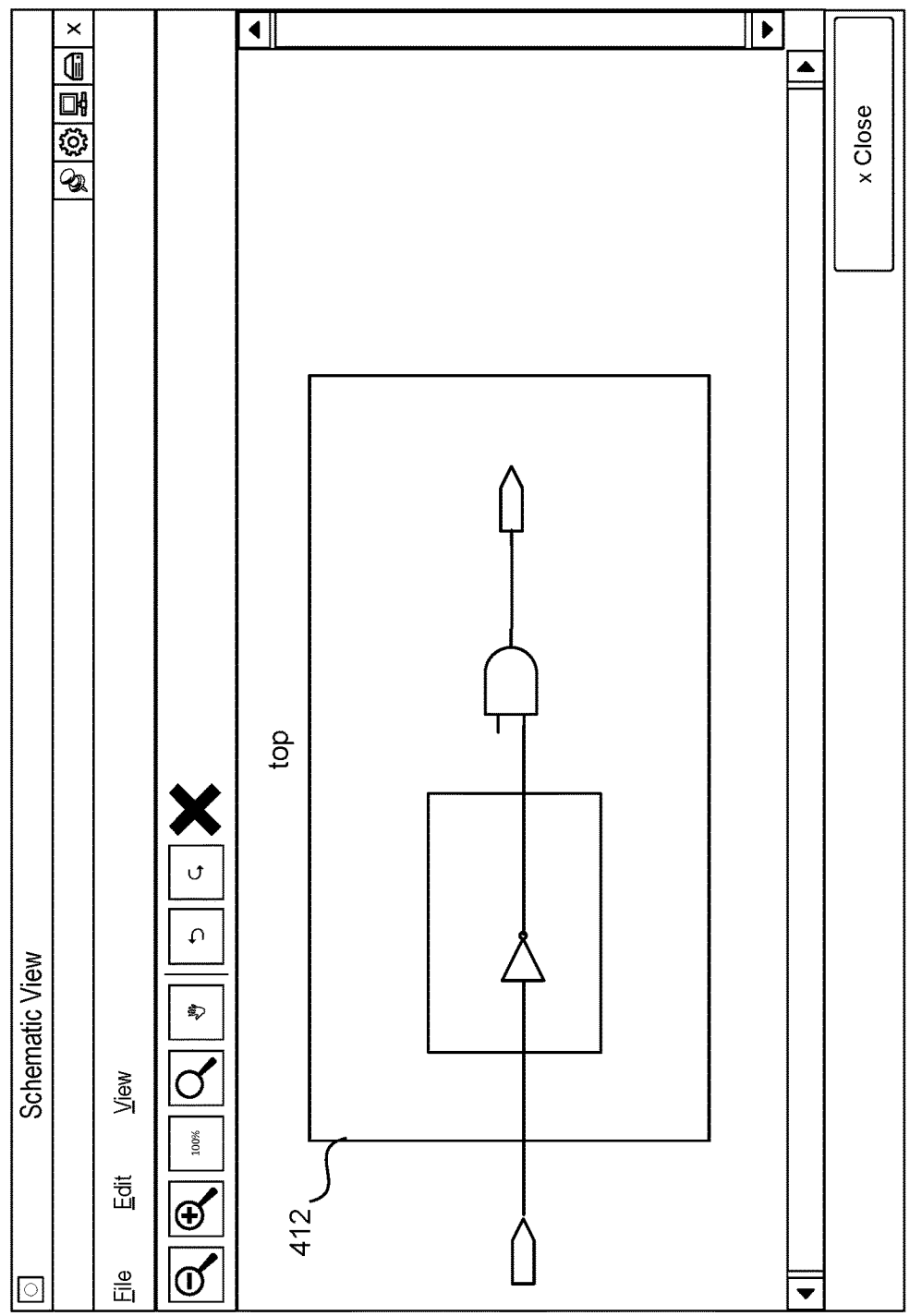
Figure 4C:
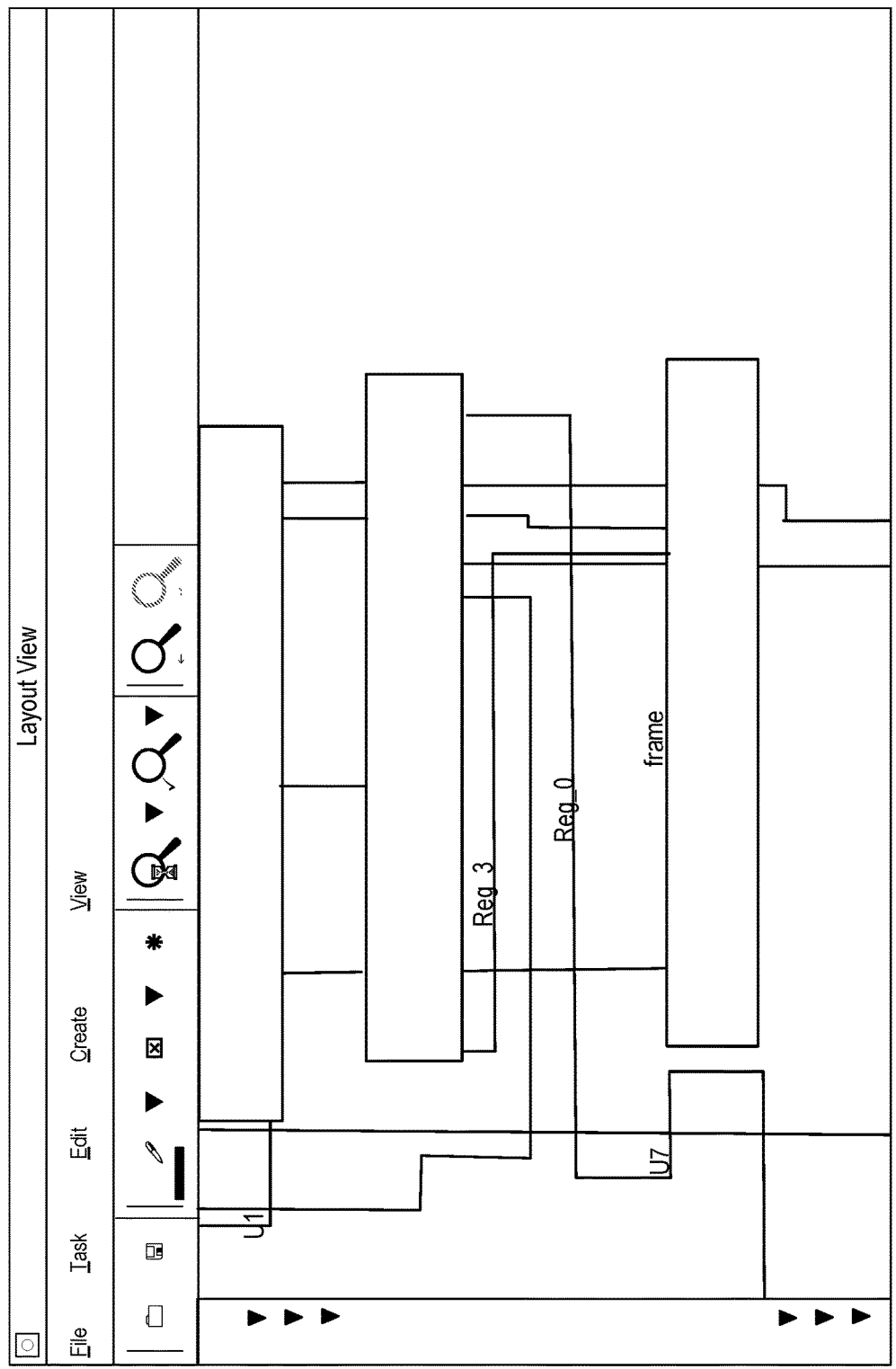

FIGS. 4A-4C illustrate exemplary GUIs of the implementation tool and the signoff tool in accordance with an embodiment of the present disclosure. As described previously herein, the violations generated by the signoff tool may be visualized, analyzed, and debugged in a familiar environment to the implementation user.

A command to invoke the signoff tool may be executed from within the implementation tool shell. An error and/or a warning may be displayed in an activity view 400 of a GUI of the signoff tool. A first pane 406 may display a summary of the warnings and errors generated by the signoff tool. For example, the information may show the total number of errors for each of the design stage and PG stage. The information may also provide a list of the errors. A user may select an error in the first pane 406. In response to the user selection, additional details associated with the selected error may displayed in a second pane 408. A third pane 410 may display information about the design. A schematic view 402 may show a selected instance that is associated with an error and/or warning. For example, cell 412 may be displayed in schematic view 402. In some aspects, the schematic view 402 may be displayed in the GUI of the signoff tool.

A layout view 404 of the RTL design may show an expended view of the selected instance. For example, a user may select a cell in the schematic view 402. Then, the layout view 404 is automatically displayed with the selected cell highlighted and/or zoomed in too. In some aspects, the layout view 404 may be shown in the GUI of the implementation tool. The layout view 404 may be used to fix the error and/or warning. For example, a command may be executed from the implementation tool shell to fix the error and/or warning. For example, a command to fix the power is run from the implementation tool. Upon fixing of the error and/or warning, the command to invoke the signoff tool again may be executed from the implementation tool. The results may be displayed in the violation display 400.

Figure 5:
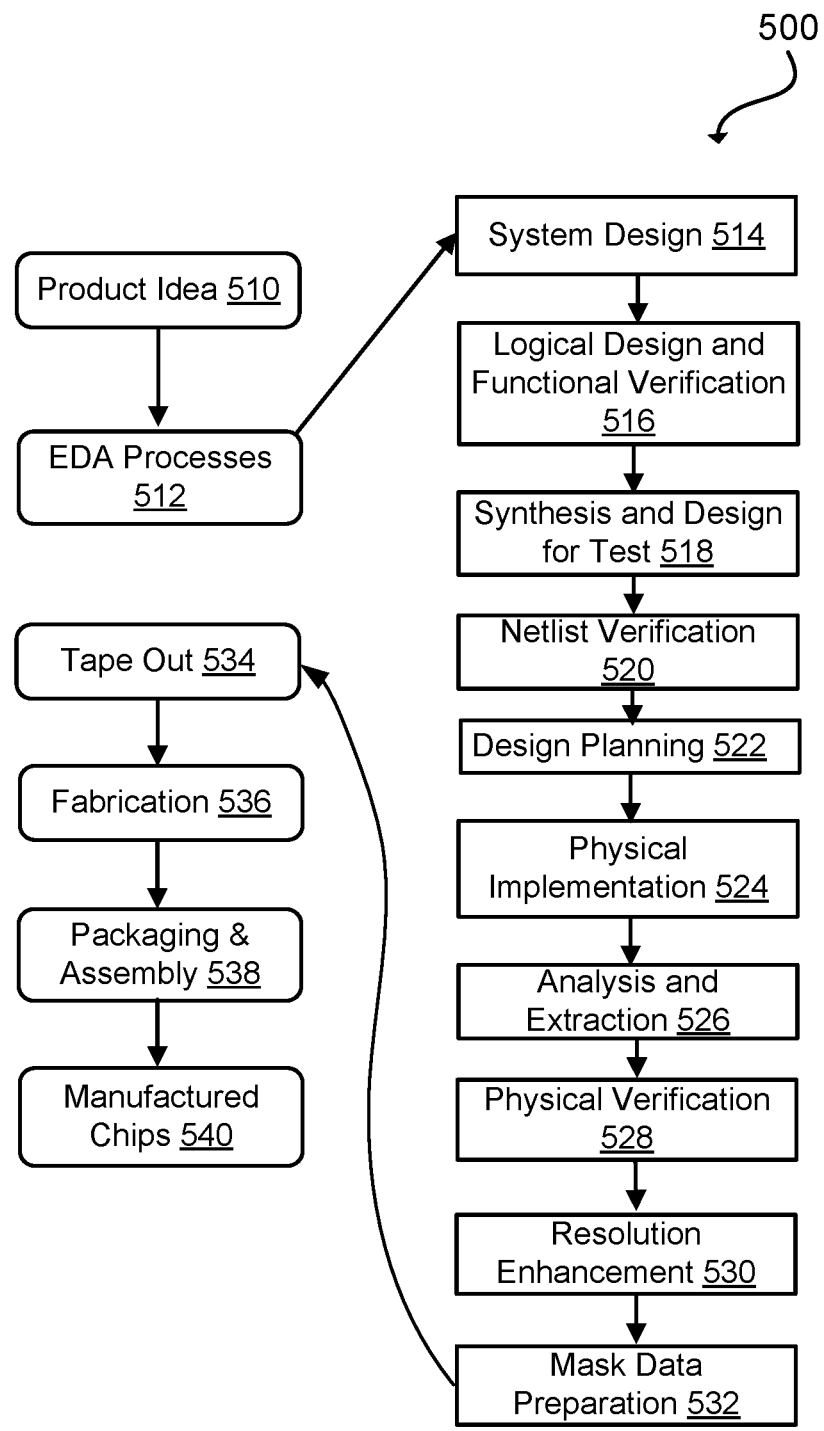
FIG. 5 illustrates a flowchart of various processes used during the design and manufacture of an integrated circuit in accordance with an embodiment of the present disclosure.

FIG. 5 illustrates an example set of processes 500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 510 with information supplied by a designer, information that is transformed to create an article of manufacture that uses a set of EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536, and packaging and assembly processes 538 are performed to produce the finished integrated circuit 540.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 5. The processes described can be enabled by EDA products (or tools).

During system design 514, the functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During the logic design and functional verification 516, modules or components in the circuit are specified in one or more description languages, and the specification is checked for functional accuracy. For example, the components of the circuit may be verified to generate outputs that match the requirements of the specification of the circuit or system being designed. Functional verification may use simulators and other programs such as test bench generators, static HDL checkers, and formal verifiers. In some embodiments, special systems of components referred to as 'emulators' or 'prototyping systems' are used to speed up the functional verification.

During synthesis and design for test 518, HDL code is transformed into a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for the production of lithography masks. During mask data preparation 532, the 'tape-out' data is used to produce lithography masks that are used to produce finished integrated circuits.

A storage subsystem of a computer system (such as computer system 600 of FIG. 6) may be used to store the programs and data structures that are used by some or all of the EDA products described herein, and products used for the development of cells for the library and for the physical and logical design that use the library.

Figure 6:
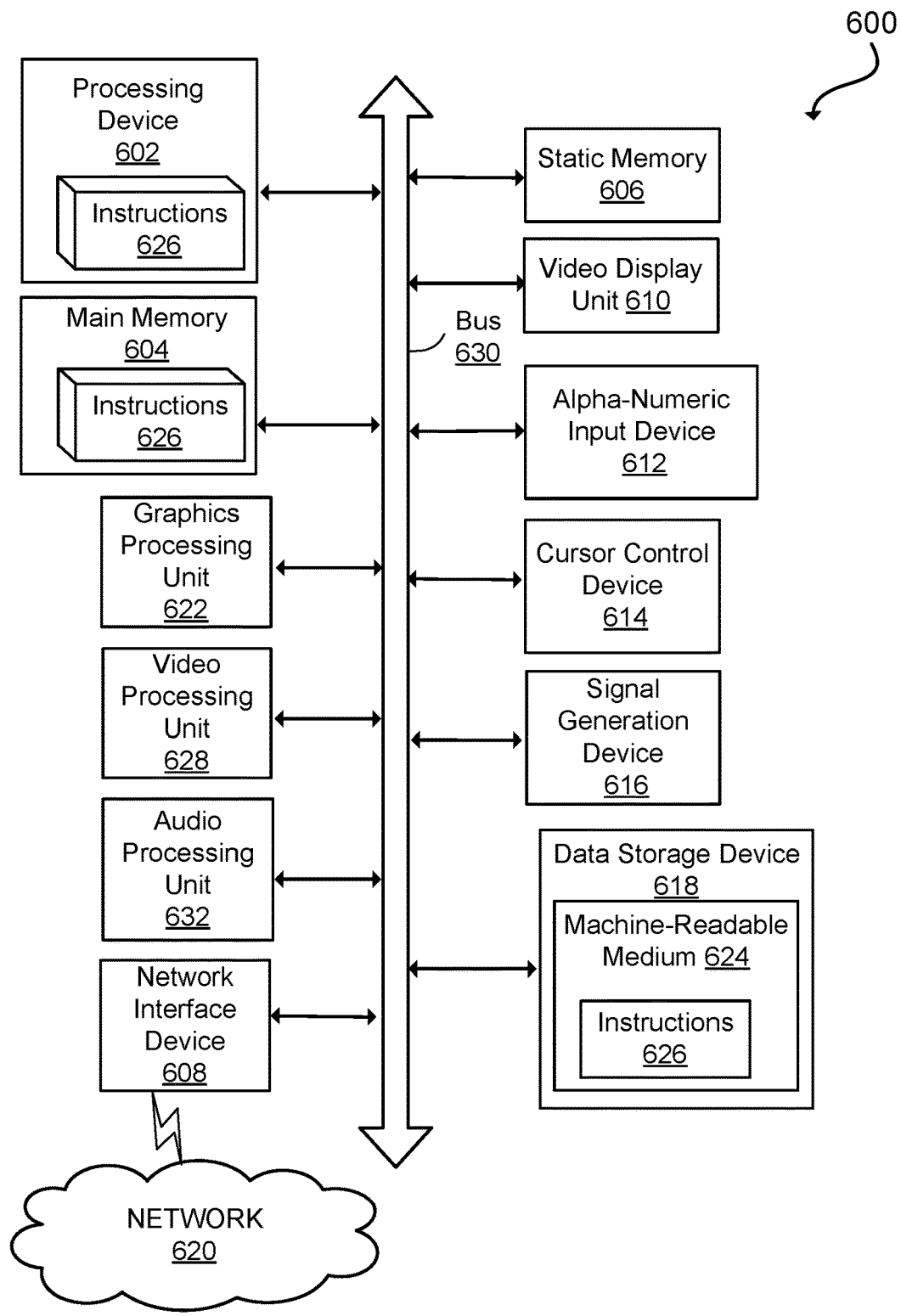
FIG. 6 illustrates an abstract diagram of an example computer system in which embodiments of the present disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

The processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 may also be one or more special-purpose processing devices such as an application-specific integrated circuit (ASIC), a field-programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604, and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work to others skilled in the art most effectively. An algorithm may be a sequence of operations leading to the desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure, as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures, and like elements are labeled with like numerals. The disclosure and drawings are, accordingly, to be regarded in an illustrative sense rather than a restrictive sense.

What is claimed is:

1. A method comprising:
    invoking, using a processor, a signoff tool via a first command from an implementation tool running on a register transfer level (RTL) design;
    executing a native command of the signoff tool from within the implementation tool, wherein the native command generates a notification;
    determining whether the RTL design passes a low-power signoff check based on the notification; and
    sending the design for final signoff verification based on the determination that the RTL design passes the low-power signoff check.

2. The method of claim 1, further comprising:
    executing a second command from the implementation tool to generate an updated design responsive to the notification when the notification indicates an error and/or a warning; and
    invoking the signoff tool from the implementation tool on the updated design.

3. The method of claim 1, further comprising:
    selecting an instance from a plurality of instances associated with the notification in a report generated by invoking the signoff tool using a graphical user interface (GUI) of the signoff tool or another shell command; and
    launching a GUI of the implementation tool in a layout view zoomed in to the selected instance in the GUI of the signoff tool to identify and resolve an issue associated with the notification.

4. The method of claim 3, further comprising:
    changing a display attribute of the selected instance in the GUI of the implementation tool.

5. The method of claim 1, wherein the RTL design is in the form of a structural netlist based design.

6. The method of claim 1, wherein the notification includes a warning, an error, or information data generated by the signoff tool.

7. The method of claim 1, further comprising:
    providing a GUI within the implementation tool;
    receiving an input from a user indicating top-level or block-level verification; and
    selecting the native command based on the input.

8. The method of claim 1, further comprising:
generating by the implementation tool a supplemental file in response to a change in a power intent of the RTL design.

9. The method of claim 1, wherein the native command executes a signoff algorithm for performing an electrical rule check on the RTL design.

10. The method of claim 1, further comprising:
determining whether the implementation tool is running in a golden unified power format (UPF) mode; and
reading a supplemental UPF file by the signoff tool before executing the native command in response to determining that the implementation tool is running in the golden UPF mode.

11. The method of claim 10, further comprising:
providing a prompt to a user to specify a directory of the supplemental UPF file.

12. The method of claim 1, further comprising:
generating a report indicating a setting of the signoff tool, wherein the report is displayed in a graphical user interface (GUI) of the implementation tool.

13. A system comprising:
a memory storing instructions; and
a processor, coupled with the memory and to execute the instructions, the instructions when executed cause the processor to:
invoke a signoff tool via a first command from an implementation tool running on a register transfer level (RTL) design;
execute a native command of the signoff tool from within the implementation tool, wherein the native command generates a notification;
determine whether the RTL design passes a low-power signoff check based on the notification; and
send the design for final signoff verification based on the determination that the RTL design passes low-power signoff check.

14. The system of claim 13, wherein the processor is further configured to:
execute a second command from the implementation tool to generate an updated design responsive to the notification when the notification indicates an error and/or a warning; and
invoke the signoff tool from the implementation tool on the updated design.

15. The system of claim 13, wherein the processor is further configured to:
select an instance from a plurality of instances associated with the notification in a report generated by invoking the signoff tool using a graphical user interface (GUI) of the signoff tool or another shell command; and
launch a GUI of the implementation tool in a layout view zoomed in to the selected instance in the GUI of the signoff tool to identify and resolve an issue associated with the notification.

16. The system of claim 13, wherein the processor is further configured to:
provide a GUI within the implementation tool;
receive an input from a user indicating top-level or block-level verification; and
select the native command based on the input.

17. The system of claim 13, wherein the processor is further configured to:
generate by the implementation tool a supplemental file in response to a change in a power intent of the RTL design.

18. The system of claim 13, wherein the signoff tool executes a signoff algorithm for performing an electrical rule check on the RTL design.

19. The system of claim 13, wherein the processor is further configured to:
determine whether the implementation tool is running in a golden unified power format (UPF) mode; and
read a supplemental UPF file by the signoff tool before executing the native command in response to determining that the implementation tool is running in the golden UPF mode.

20. A non-transitory computer readable medium comprising stored instructions, which when executed by a processor, cause the processor to:
invoke a signoff tool via a first command from an implementation tool running on a register transfer level (RTL) design;
execute a native command of the signoff tool from within the implementation tool, wherein the native command generates a notification;
determine whether the RTL design passes a low-power signoff check based on the notification; and
send the design for final signoff verification based on the determination that the RTL design passes low-power signoff check.

* * * * *